US009489888B2

(12) United States Patent
Kim et al.

(10) Patent No.: US 9,489,888 B2
(45) Date of Patent: Nov. 8, 2016

(54) ORGANIC LIGHT EMITTING DISPLAY DEVICE AND METHOD OF DRIVING THE SAME TO INCLUDE A COMPENSATION STRATEGY APPLIED DURING DIFFERENT TIME PERIODS

(71) Applicant: LG DISPLAY CO., LTD., Seoul (KR)

(72) Inventors: Jung Hyeon Kim, Paju-si (KR); Bum Sik Kim, Suwon-si (KR); Seung Tae Kim, Goyang-si (KR); Myung-Gi Lim, Ansan-si (KR)

(73) Assignee: LG Display Co., Ltd., Seoul (KR)

( * ) Notice: Subject to any disclaimer, the term of this patent is extended or adjusted under 35 U.S.C. 154(b) by 176 days.

(21) Appl. No.: 14/100,894

(22) Filed: Dec. 9, 2013

(65) Prior Publication Data

US 2014/0176516 A1 Jun. 26, 2014

(30) Foreign Application Priority Data

Dec. 24, 2012 (KR) ........................ 10-2012-0152560

(51) Int. Cl.
*G06F 3/038* (2013.01)
*G09G 5/00* (2006.01)
*G09G 3/32* (2016.01)

(52) U.S. Cl.
CPC .... *G09G 3/3233* (2013.01); *G09G 2300/0842* (2013.01); *G09G 2320/0295* (2013.01); *G09G 2320/043* (2013.01); *G09G 2320/048* (2013.01); *G09G 2360/16* (2013.01)

(58) Field of Classification Search
CPC ..................... G09G 3/3233; G09G 2320/043; G09G 2320/045
USPC .................................................... 345/204, 76
See application file for complete search history.

(56) References Cited

U.S. PATENT DOCUMENTS

| | | | | |
|---|---|---|---|---|
| 8,405,585 B2 * | 3/2013 | Wang | G09G 3/3225 345/204 |
| 2007/0146276 A1 | 6/2007 | Syu et al. | |
| 2009/0051628 A1 | 2/2009 | Kwon | |
| 2009/0140959 A1 * | 6/2009 | Nam | G09G 3/3233 345/76 |
| 2009/0160740 A1 | 6/2009 | Leon et al. | |
| 2009/0251493 A1 | 10/2009 | Uchino et al. | |
| 2011/0122119 A1 * | 5/2011 | Bae | G09G 3/3233 345/211 |
| 2013/0050292 A1 * | 2/2013 | Mizukoshi | G09G 3/3291 345/690 |

* cited by examiner

*Primary Examiner* — Kwang-Su Yang
(74) *Attorney, Agent, or Firm* — Brinks Gilson & Lione

(57) ABSTRACT

A method of driving an organic light emitting display device includes sensing characteristics of driving TFTs of pixels to generate sensing data at a power-on time when the organic light emitting display device is powered on, merging initial compensation data and the sensing data at the power-on time to compensate for the characteristics of the driving TFTs of all the pixels, displaying an image in a driving mode and sequentially sensing characteristics of driving TFTs of a plurality of pixels in units of one horizontal line in real time during a blank interval between frames, and sequentially compensating for the characteristics of the driving TFTs of the pixels in units of one horizontal line in real time by using a real-time sensing data generated by real-time sensing.

19 Claims, 8 Drawing Sheets

ORGANIC LIGHT EMITTING DISPLAY DEVICE AND METHOD OF DRIVING THE SAME TO INCLUDE A COMPENSATION STRATEGY APPLIED DURING DIFFERENT TIME PERIODS

CROSS-REFERENCE TO RELATED APPLICATIONS

This application claims the benefit of the Korean Patent Application No. 10-2012-0152560 filed on Dec. 24, 2012, which is hereby incorporated by reference as if fully set forth herein.

BACKGROUND

1. Field of the Disclosure

The present disclosure relates to an organic light emitting display device, and more particularly, to an organic light emitting display device and a method of driving the same, which can increase accuracy and stability in compensating for deterioration of a driving thin film transistor (TFT).

2. Discussion of the Related Art

FIG. 1 is a circuit diagram for describing a pixel structure of a related art organic light emitting display device.

Referring to FIG. 1, the related art organic light emitting display device includes a display panel in which a plurality of pixels are formed. Each of the pixels includes a first switching TFT ST1, a second switching TFT ST2, a driving TFT DT, a capacitor Cst, and an organic light emitting diode OLED.

The first switching TFT ST1 is turned on according to a scan signal (gate driving signal) supplied to a corresponding gate line GL. The first switching TFT ST1 is turned on, and thus, a data voltage Vdata supplied to a corresponding data line DL is supplied to the driving TFT DT.

The driving TFT DT is turned on with the data voltage Vdata supplied to the first switching TFT ST1. A data current Ioled flowing to the organic light emitting diode OLED is controlled with a switching time of the driving TFT DT. A first driving voltage VDD is supplied to a power line PL, and, when the driving TFT DT is turned on, the data current Ioled is applied to the organic light emitting diode OLED.

The capacitor Cst is connected between a gate and source of the driving TFT DT. The capacitor Cst stores a voltage corresponding to the data voltage Vdata supplied to the gate of the driving TFT DT. The driving TFT DT is turned on with the voltage stored in the capacitor Cst.

The organic light emitting diode OLED is electrically connected between the source of the driving TFT DT and a cathode voltage VSS. The organic light emitting diode OLED emits light with the data current Ioled supplied from the driving TFT DT.

The related art organic light emitting display device controls a level of the data current Ioled flowing from a first driving voltage VDD terminal to the organic light emitting diode OLED with a switching time of the driving TFT DT based on the data voltage Vdata. Therefore, the organic light emitting diode OLED of each pixel emits light, thereby realizing an image.

However, the threshold voltage (Vth) and mobility characteristics of the driving TFTs DT of the respective pixels are differently shown due to a non-uniformity of a TFT manufacturing process. For this reason, in general organic light emitting display devices, despite that the same data voltage Vdata is applied to the driving TFTs DT of the respective pixels, it is unable to realize a uniform image quality due to a deviation of currents flowing in the respective organic light emitting diodes OLED.

To solve a non-uniformity of an image quality, the second switching TFT ST2 is additionally formed in each pixel. The second switching TFT ST2 is turned on according to a sensing signal applied to a corresponding sensing signal line SL. The second switching TFT ST2 is turned on, and thus, the data current Ioled supplied to the organic light emitting diode OLED is supplied to an analog-to-digital converter (ADC) of a data driver. A plurality of the sensing signal lines SL are formed in the same direction as that of the gate line GL.

FIG. 2 is a diagram illustrating a method of compensating for a characteristic deviation of the driving TFTs in the related art organic light emitting display device.

Referring to FIG. 2, the display panel has been manufactured, and then, before a product is released, the second switching TFTs ST2 of all the pixels are turned on, and a voltage charged into each of a plurality of reference power lines RL is sensed, in operation S1. Subsequently, the compensation method generates sensing data corresponding to the sensed characteristics (threshold voltage/mobility) of the driving TFTs DT of all the pixels.

Subsequently, the compensation method generates initial compensation data on the basis of the sensing data, and initially compensates for the characteristics (threshold voltage/mobility) of the driving TFTs DT of all the pixels with the initial compensation data.

After the initial compensation, when the display panel has been released as a product, real-time sensing is performed. The compensation method selectively turns on the second switching TFTs ST2 of a plurality of pixels arranged on one horizontal line during a blank interval between frames to sense a voltage charged into each reference power line RL in real time while displaying an image, in operation S3.

Subsequently, the compensation method converts the sensed voltage into compensation data corresponding to the characteristic (threshold voltage/mobility) of the driving TFT DT of each pixel. The compensation method compensates the characteristic of the driving TFT with the compensation data, in operation S4.

Subsequently, the compensation method checks whether the organic light emitting display device is powered off in operation. S5, and, when the organic light emitting display device is not powered off, the compensation method repeats operations S3 to S5 to compensate for the characteristics of the driving TFTs of all the pixels in real time.

However, when the organic light emitting display device is driven for a long time, there is a limitation in measuring a characteristic deviation of the pixels to compensate for the characteristic deviation in real time.

Specifically, a range for sensing the characteristic of each driving TFT and a range of compensation data are decided according to an output range of each of the ADCs of the data driver. It is difficult to expand the output range of each ADC of the data driver, and for this reason, there is a limitation in range of compensating for a deviation of the driving TFTs at one time through real-time sensing.

Moreover, when a change amount of characteristic of each driving TFT is large due to long-time driving, it is unable to all sense the changed characteristics and compensate for the sensed changes at one time, and thus, it is required to perform sensing and compensation driving several times. Especially, when the characteristic of each driving TFT deviates from a range of a corresponding ADC, it is unable to accurately sense a change in characteristic of each driving TFT, and thus, an accuracy of compensation decreases.

In real-time sensing and compensation driving, since sensing and compensation are performed during the blank interval while displaying an image, an error of a sensing value occurs due to a data voltage supplied to each pixel for displaying an image immediately before sensing.

Moreover, since a real-time sensing scheme is sensitive to an influence of an ambient environment (for example, temperature), there is a high possibility that an error of sensing data occurs.

Moreover, when sensing and compensation driving are performed in several stages, a user can perceive a sensing line, and a luminance difference occurs between pixels under compensation and other pixels, causing a degradation of a display quality.

To solve such problems, the range of each ADC may be greatly set. However, when a compensation range of each ADC is large, compensation of each pixel may be performed at a fast speed, but in this case, an influence of a noise increases. As the range of each ADC is expanded, a sensing range and a compensation range are expanded together, and an accuracy of sensing decreases. Furthermore, since a large compensation value is reflected at one time, a user perceives a change in luminance.

SUMMARY

A method of driving an organic light emitting display device, which includes a display panel including a plurality of pixels including a pixel circuit for emitting light from an organic light emitting diode and a driving circuit unit driving the display panel, includes: when the organic light emitting display device is powered on, sensing characteristics of driving thin film transistors (TFTs) of all the pixels to generate sensing data at a power-on time; merging initial compensation data and the sensing data at the power-on time to compensate for the characteristics of the driving TFTs of all the pixels, the initial compensation data being generated when initial compensation is performed before the display panel is released; displaying an image in a driving mode, and sequentially sensing characteristics of driving TFTs of a plurality of pixels in units of one horizontal line in real time during a blank interval between frames; and sequentially compensating for the characteristics of the driving TFTs of the pixels in units of one horizontal line in real time by using a real-time sensing data generated by real-time sensing.

In another aspect of the present invention, an organic light emitting display device includes a display panel including a plurality of pixels including a pixel circuit for emitting light from an organic light emitting diode and a driving circuit unit driving the display panel, including: a sensing unit configured to operate a data driver and gate driver of the driving circuit unit in a sensing mode to allow all the pixels of the display panel to be sensed, at a power-on time when the display device is powered on or a power-off time when the display device is powered off; a compensation data calculating unit configured to calculate changes in characteristics of driving TFTs of all the pixels using first sensing data by sensing at the power-on time and second sensing data by sensing at the power-off time to update compensation data; and a panel driving unit configured to convert input image data into data voltages by using the compensation data, and supply the data voltages with the compensation data reflected therein to the respective pixels to compensate for the characteristics of the driving TFTs of the respective pixels.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE EXEMPLARY EMBODIMENTS

Figure 1:
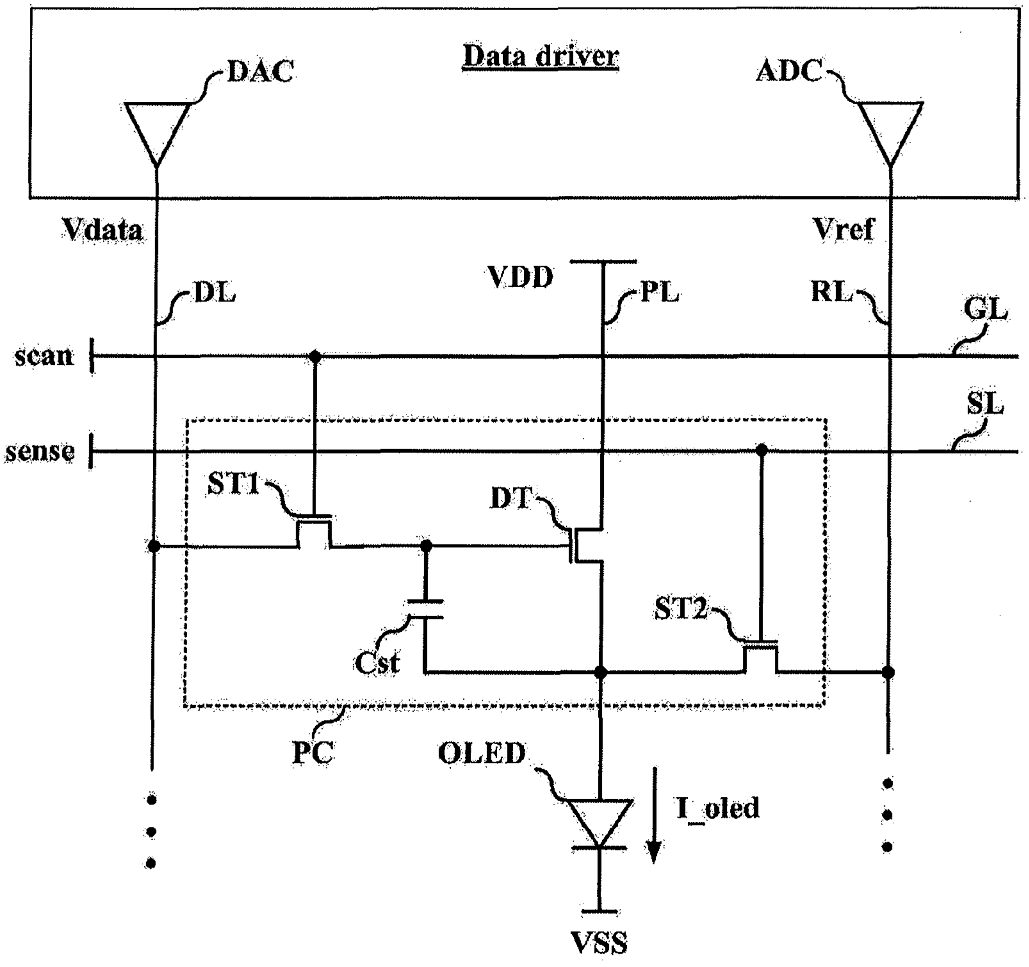
FIG. 1 Related Art
FIG. 1 is a circuit diagram for describing a pixel structure of a related art organic light emitting display device.
Figure 2:
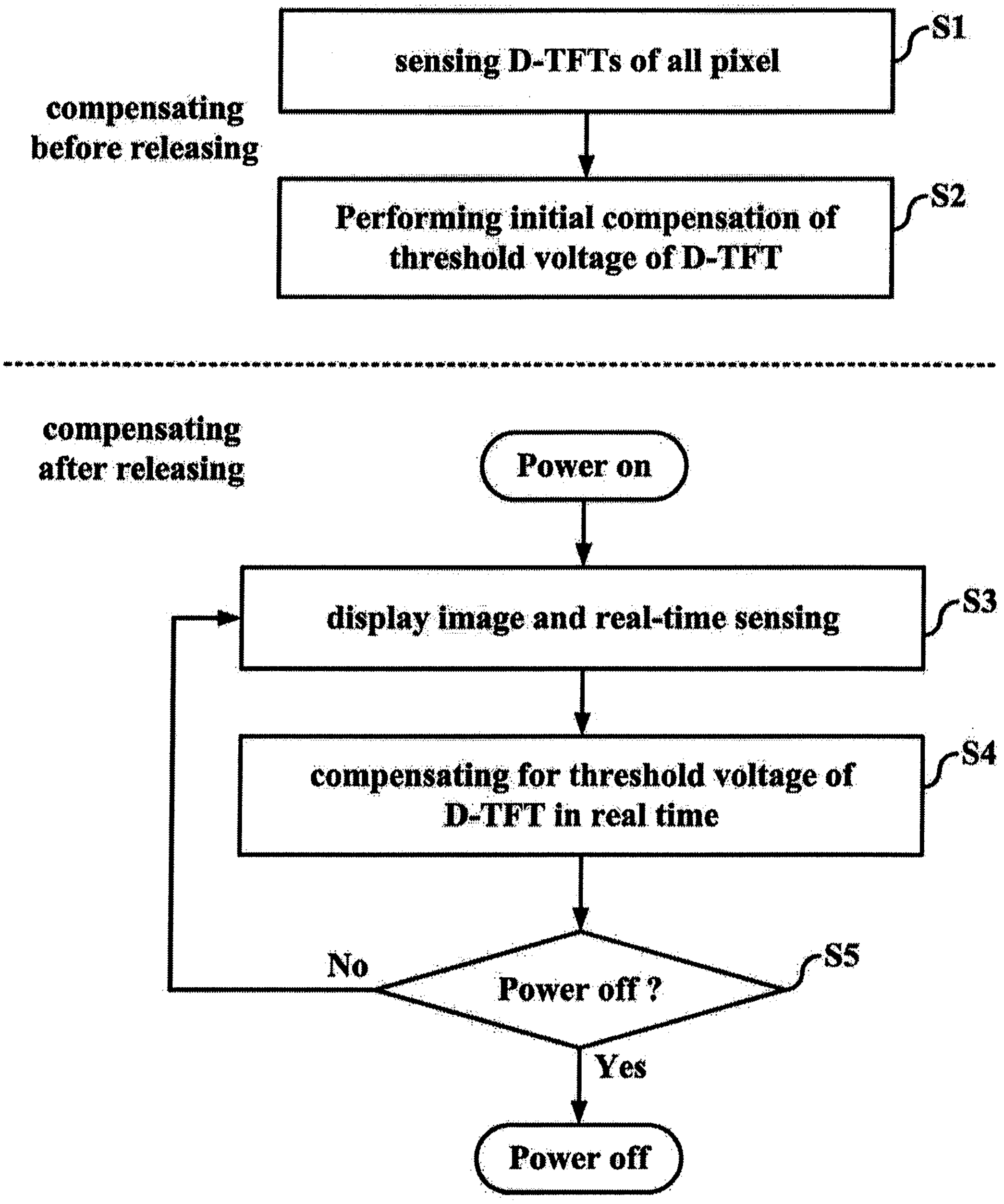
FIG. 2 Related Art
FIG. 2 is a diagram illustrating a method of compensating for a characteristic deviation of driving TFTs in the related art organic light emitting display device.

In the specification, in adding reference numerals for elements in each drawing, it should be noted that like reference numerals already used to denote like elements in other drawings are used for elements wherever possible.

The terms described in the specification should be understood as follows.

As used herein, the singular forms "a", "an" and "the" are intended to include the plural forms as well, unless the context clearly indicates otherwise. The terms "first" and "second" are for differentiating one element from the other element, and these elements should not be limited by these terms.

It will be further understood that the terms "comprises", "comprising,", "has", "having", "includes" and/or "including", when used herein, specify the presence of stated features, integers, steps, operations, elements, and/or components, but do not preclude the presence or addition of one or more other features, integers, steps, operations, elements, components, and/or groups thereof.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

A compensation scheme is categorized into an internal compensation scheme and an external compensation scheme depending on a position of a circuit that compensates for a characteristic deviation of pixels. The internal compensation scheme is a scheme in which a compensation circuit for compensating for a characteristic deviation of pixels is disposed inside each of the pixels. The external compensation scheme is a scheme in which the compensation circuit for compensating for a characteristic deviation of pixels is disposed outside each pixel. The present invention relates to an organic light emitting display device using the external compensation scheme and a method of driving the same.

The present invention proposes an organic light emitting display device and a method of driving the same, which can reduce sensing errors when sensing characteristics of driving TFTs in real time, and shorten a time taken in compensating for the characteristics of the driving TFTs in real time.

The organic light emitting display device and a pixel structure will be first described, and then the organic light emitting display device and the method of driving the same according to an embodiment of the present invention will be described.

Figure 3:
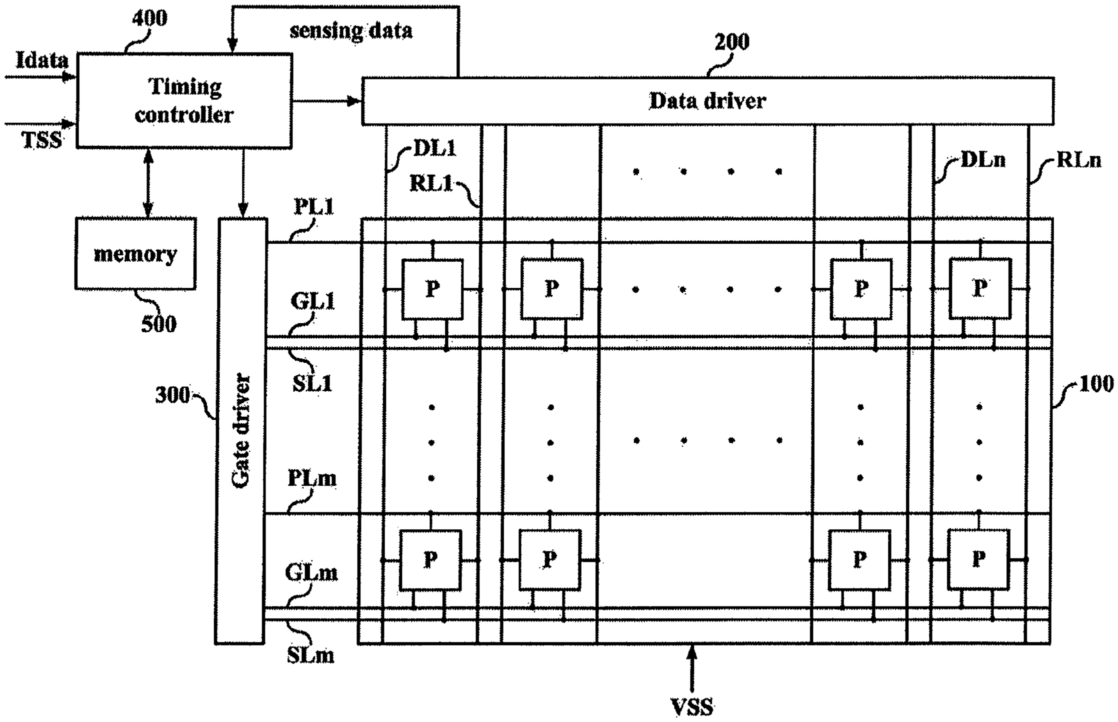
FIG. 3 is a diagram schematically illustrating an organic light emitting display device according to an embodiment of the present invention.
Figure 4:
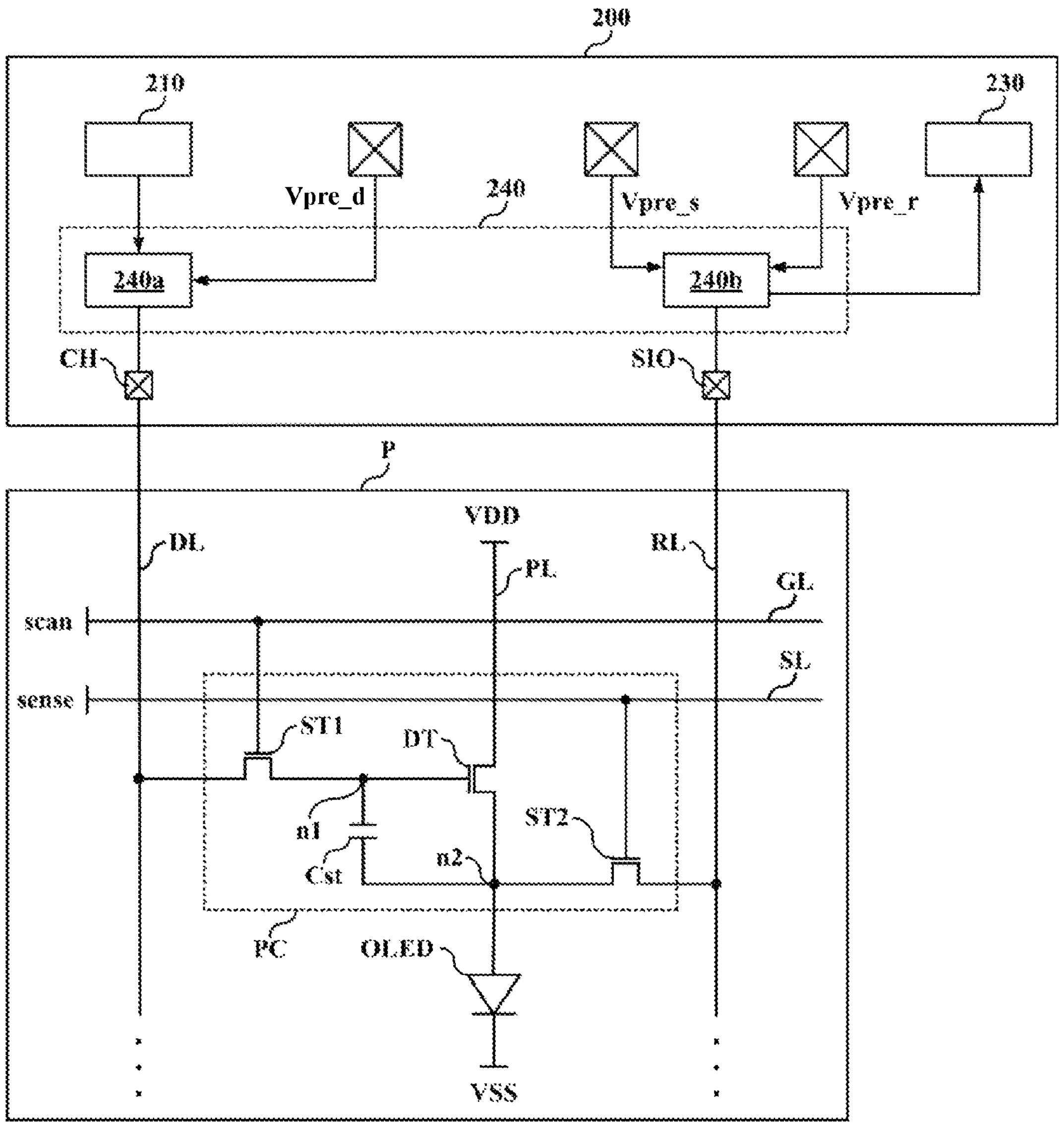
FIG. 4 is a circuit diagram for describing a data driver and pixel structure of the organic light emitting display device according to an embodiment of the present invention.

FIG. 3 is a diagram schematically illustrating an organic light emitting display device according to an embodiment of the present invention. FIG. 4 is a circuit diagram for describing a data driver and pixel structure of the organic light emitting display device according to an embodiment of the present invention.

Referring to FIGS. 3 and 4, the organic light emitting display device according to an embodiment of the present invention includes a display panel 100 and a driving circuit unit.

The driving circuit unit includes a data driver 200, a gate driver 300, a timing controller 400, and a memory 500 storing compensation data.

The display panel 100 includes a plurality of gate lines GL, a plurality of sensing signal lines SL, a plurality of data lines DL, a plurality of driving power lines PL, a plurality of reference power lines RL, and a plurality of pixels P.

Each of the plurality of pixels P includes an organic light emitting diode OLED and a pixel circuit PC for emitting light from the organic light emitting diode OLED. A difference voltage (Vdata-Vref) between a data voltage Vdata and a reference voltage Vref is charged into a capacitor Cst connected between a gate and source of a driving TFT DT. The driving TFT DT is turned on with a voltage charged into the capacitor Cst. The organic light emitting diode OLED emits light with a data current Ioled which flows from a first driving voltage VDD terminal to a second driving voltage VSS terminal through the driving TFT DT.

Each of the pixels P may include one of a red pixel, a green pixel, a blue pixel, and a white pixel. One unit pixel for displaying one image may include adjacent red pixel, green pixel, and blue pixel, or may include adjacent red pixel, green pixel, blue pixel, and white pixel.

Each of the plurality of pixels P is formed in a pixel area defined in the display panel 100. To this end, the plurality of gate lines GL, the plurality of sensing signal lines SL, the plurality of data lines DL, the plurality of driving power lines PL, and the plurality of reference power lines RL are formed in the display panel 100 in order to define the pixel area.

The plurality of gate lines GL and the plurality of sensing signal lines SL may be parallelly formed in a first direction (for example, a horizontal direction) in the display panel 100. A scan signal (gate driving signal) is applied from the gate driver 300 to the gate lines GL. A sensing signal is applied from the gate driver 300 to the sensing signal lines SL.

The plurality of data lines DL may be formed in a second direction (for example, a vertical direction) to intersect the plurality of gate lines GL and the plurality of sensing signal lines SL. Data voltages Vdata are respectively supplied from the data driver 200 to the data lines DL. Each of the data voltages Vdata has a voltage level to which a compensation voltage corresponding to a change in characteristic (threshold voltage/mobility) of a driving TFT DT of a corresponding pixel P is added.

A compensation of a characteristic (threshold voltage/mobility) of a driving TFT using the compensation voltage may be selectively performed at a power-on time when the organic light emitting display device is powered on, a driving time when an image is displayed, or a power-off time when the organic light emitting display device is powered off.

The plurality of reference power lines RL are formed in parallel to the plurality of data lines DL. A display reference voltage Vpre_r or a sensing precharging voltage Vpre_s may be selectively supplied from the data driver 200 to each of the reference power lines RL. At this time, the display reference voltage Vpre_r may be supplied to each reference power line RL during a period for which each pixel P is charged with data. The sensing precharging voltage Vpre_s may be supplied to each reference power line RL during a period for which a threshold voltage/mobility of the driving TFT DT of each pixel P is detected.

The plurality of driving power lines PL may be formed in parallel to the plurality of gate lines GL, and the first driving voltage VDD may be supplied to the pixels P through the plurality of driving power lines PL.

As illustrated in FIG. 4, the capacitor Cst of each pixel P is charged with a difference voltage (Vdata−Vref) between the data voltage Vdata and the reference voltage Vref during a data charging period. Each pixel P includes a pixel circuit PC that supplies the data current Ioled to the organic light emitting diode OLED according to a voltage charged into the capacitor Cst during a light emitting period.

The pixel circuit PC of each pixel P includes a first switching TFT ST1, a second switching TFT ST2, the driving TFT DT, and the capacitor Cst. Here, the TFTs ST1, ST2 and DT are N-type TFTs, and for example, may be an a-Si TFT, a poly-Si TFT, an oxide TFT, or an organic TFT. However, the present invention is not limited thereto, and the TFTs ST1, ST2 and DT may be formed as P-type TFTs.

The first switching TFT ST1 has a gate connected to a corresponding gate line GL, a source (first electrode) connected to a data line DL, and a drain (second electrode) connected to a first node n1 connected to a gate of the driving TFT DT.

The first switching TFT ST1 is turned on according to a gate-on voltage level of scan signal supplied to the gate line GL. When the first switching TFT ST1 is turned on, a data voltage Vdata supplied to a corresponding data line DL is supplied to the first node n1, namely, a gate of the driving TFT DT.

The second switching TFT ST2 has a gate connected to a corresponding sensing signal line SL, a source (first electrode) connected to a corresponding reference power line RL, and a drain (second electrode) connected to a second node n2 connected to the driving TFT DT and the organic light emitting diode OLED.

The second switching TFT ST2 is turned on according to a gate-on voltage level of sensing signal supplied to the sensing signal line SL. When the second switching TFT ST2 is turned on, the display reference voltage Vpre_r or sensing precharging voltage Vpre_s supplied to the reference power line RL is supplied to the second node n2.

The capacitor Cst is connected between a gate and drain a source of the driving TFT DT, namely, between the first node n1 and the second node n2. The capacitor Cst is charged with a difference voltage between voltages respectively supplied to the first and second nodes n1 and n2. The driving TFT DT is turned on with a voltage charged into the capacitor Cst.

The gate of the driving TFT DT is connected to the drain of the first switching TFT ST1 and a first electrode of the capacitor Cst in common. The drain of the driving TFT DT is connected to a corresponding driving power line PL. A source of the driving TFT DT is connected to the drain of the second switching TFT ST2, a second electrode of the capacitor Cst, and an anode of the organic light emitting diode OLED.

The driving TFT DT is turned on with a voltage charged into the capacitor Cst at every light emitting period, and controls an amount of current flowing to the organic light emitting diode OLED according to the first driving voltage VDD.

The organic light emitting diode OLED emits light with the data current Ioled supplied from the driving TFT DT of the pixel circuit PC, thereby emitting single color light having a luminance corresponding to the data current Ioled.

To this end, the organic light emitting diode OLED includes the anode connected to the second node n2 of the pixel circuit PC, an organic layer (not shown) formed on the anode, and a cathode (not shown) that is formed on the organic layer and receives the second driving voltage VSS.

The organic layer may be formed to have a structure of hole transport layer/organic emission layer/electron transport layer or a structure of hole injection layer/hole transport layer/organic emission layer/electron transport layer/electron injection layer. Furthermore, the organic layer may further include a functional layer for enhancing a light efficiency and/or service life of the organic emission layer. In this case, the second driving voltage VSS may be supplied to the cathode of the organic light emitting diode OLED through a second driving power line (not shown) that is formed in a line shape.

Figure 5:
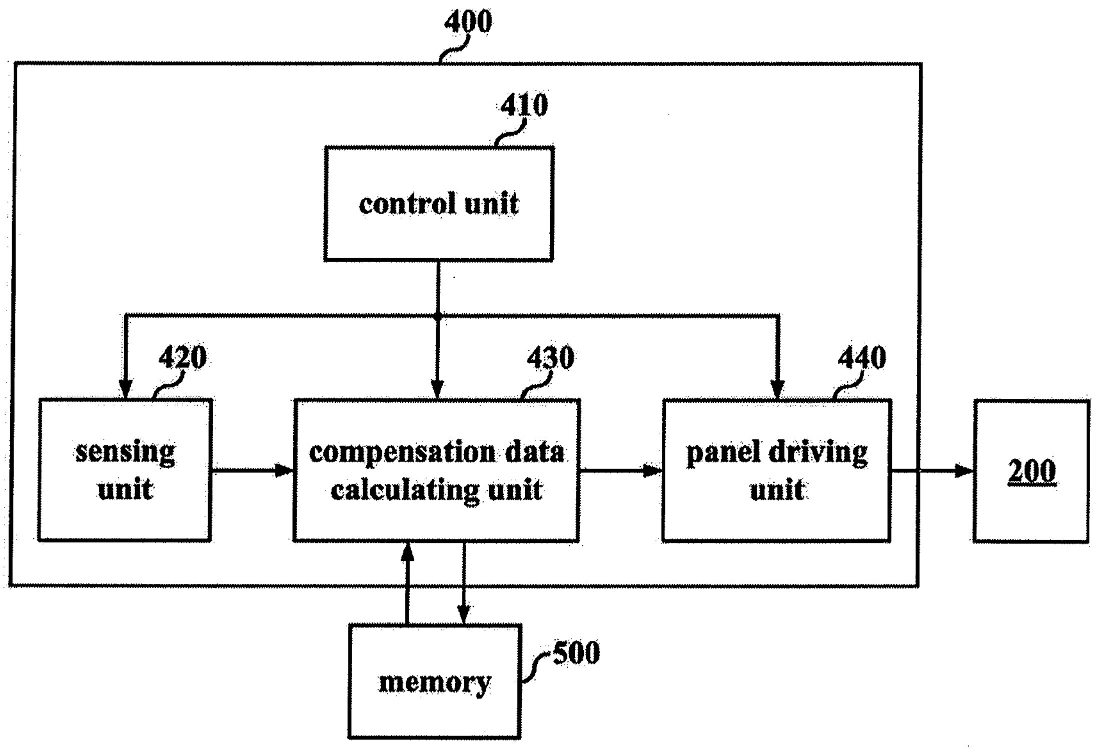
FIG. 5 is a circuit diagram for describing a timing controller of the organic light emitting display device according to an embodiment of the present invention.

FIG. 5 is a circuit diagram for describing a timing controller of the organic light emitting display device according to an embodiment of the present invention.

Referring to FIG. 5, a timing controller 400 according to an embodiment of the present invention includes a control unit 410, a sensing unit 420, a compensation data calculating unit 430, and a panel driving unit 440. The timing controller 400 including the above-described configuration operates the data driver 200 and the gate driver 300 in a sensing mode and a driving mode, respectively.

The control unit 410 of the timing controller 400 controls operations of the sensing unit 420, compensation data calculating unit 430, and panel driving unit 440 on the basis of a timing sync signal TSS.

Here, the timing sync signal TSS may include a vertical sync signal Vsync, a horizontal sync signal Hsync, a data enable signal DE, and a clock DCLK.

The timing controller 400 generates a gate control signal GCS and a data control signal DCS with the timing sync signal TSS. The gate control signal GCS for controlling the gate driver 300 may include a gate start signal and a plurality of clock signals. The data control signal DCS for controlling the data driver 200 may include a data start signal, a data shift signal, and a data output signal.

The timing controller 400 selectively operates the data driver 200 and the gate driver 300 in the sensing mode using the sensing unit 420, at a power-on time when the organic light emitting display device is powered on, a driving time when an image is displayed, or a power-off time when the organic light emitting display device is powered off.

Here, a sensing operation at the power-on time is performed for a time of about 2 sec before display of an image is started by supply of power. At the power-on time, the sensing operation may sense the changes in characteristics of the driving TFTs of all pixels of the display panel 100 to generate sensing data in which the changes in characteristics of the driving TFTs of all the pixels are reflected.

A sensing operation at the driving time when an image is displayed sequentially senses all horizontal lines in units of one horizontal line during a blank interval between an nth frame and an n+1 st frame while a driving operation is performed. Subsequently, sensing data in which a change in characteristic of the driving TFT of each pixel is reflected may be generated.

A sensing operation at the power-off time may be performed for a time of 30 to 60 sec after the display device is powered off. Display of an image, real-time sensing, and real-time compensation are ended at the power-off time. However, main power of a system is maintained as-is, and the changes in characteristics of the driving TFTS of all pixels of the display panel 100 are accurately sensed for a time of 30 to 60 sec. Subsequently, sensing data in which the changes in characteristics of the driving TFTS of all the pixels are reflected may be generated.

Specifically, the sensing unit 420 of the timing controller 400 operates the data driver 200 in the sensing mode. In the sensing mode, the characteristics of the driving TFTs of all or some pixels are sensed through the data driver 200. The sensing unit 420 loads the sensing data, generated by the sensing operation, from the data driver 200.

The compensation data calculating unit 430 of the timing controller 400 calculates a change in characteristic of each driving TFT by using the sensing data. At this time, the compensation data calculating unit 430 may merge the sensing data and initial compensation data stored in a memory 500 to calculate a change in characteristic of each driving TFT, and update compensation data.

Specifically, the compensation data calculating unit 430 loads the initial compensation data stored in the memory 500. Subsequently, the compensation data calculating unit 430 calculates a change in characteristic of each driving TFT by using the sensing data generated by the sensing operation at the power-on time, driving time, and power-off time. At this time, the compensation data calculating unit 430 may merge the sensing data and the initial compensation data stored in the memory 500 to calculate a change in characteristic of each driving TFT, thereby generating compensation data.

Here, the compensation data calculating unit 430 may reflect the sensing data, generated by the sensing operation, in the initial compensation data stored in the memory 500 to update the compensation data, and store the updated compensation data in the memory 500.

The compensation data generated on the basis of the sensing data at the power-off time may be applied at a next power-on time. Accordingly, the present invention can reduce an influence of the changes in characteristics of the driving TFTs of all the pixels due to driving before the display device is powered on.

The compensation data generated on the basis of the sensing data at the power-off time may be stored in the memory 500 separately. Subsequently, the compensation data calculating unit 430 may load the compensation data at a next driving time or a predetermined time, and use the compensation data in compensation of all the pixels.

The display panel has been manufactured, and then, before a product is released, the initial compensation data may be stored in the memory 500. The initial compensation data is stored in the memory 500 for compensating for the characteristics of the driving TFTs of all the pixels on the basis of the sensing data generated by sensing the driving TFTs of all the pixels before the product is released. The compensation data calculating unit 430 may load the initial compensation data stored in the memory 500 to initialize the characteristics of the driving TFTs of all the pixels.

The panel driving unit 440 of the timing controller 400 generates predetermined detection data and supplies the detection data to the data driver 200 in the sensing mode.

The panel driver 440 converts input image data into data voltages Vdata by using the compensation data in the driving mode.

Specifically, the panel driving unit 440 corrects external input data Idata by using the compensation data based on the sensing data generated in the sensing mode, in the driving mode. Corrected pixel data DATA are supplied to the data driver 200.

In this case, the pixel data DATA to be supplied to each pixel P has a voltage level in which a compensation voltage for compensating for a change in characteristic (threshold voltage/mobility) of the driving TFT DT of each pixel P is reflected. Like this, the panel driving unit 440 respectively supplies the data voltages Vdata to all the pixels of the display panel 100 to enable an image to be displayed, and compensates for the pixels in real time.

The input data Idata may include input red, green, and blue data to be supplied to one unit pixel. Furthermore, when the unit pixel is configured with a red pixel, a green pixel, and a blue pixel, one piece of pixel data DATA may be red data, green data, or blue data.

On the other hand, when the unit pixel is configured with a red pixel, a green pixel, a blue pixel, and a white pixel, one piece of pixel data DATA may be red data, green data, blue data, or white data.

Referring again to FIG. 3, the gate driver 300 operates in the driving mode and the sensing mode according to mode control by the timing controller 400. The gate driver 300 is connected to the plurality of gate lines GL and the plurality of sensing signal lines SL.

The gate driver 300 generates a gate-on voltage level of scan signal at every horizontal period according to the gate control signal GCS supplied from the timing controller 400, in the driving mode. The gate driver 300 sequentially supplies the scan signal to the plurality of gate lines GL.

The scan signal has a gate-on voltage level during a data charging period of each pixel P. The scan signal has a gate-off voltage level during a light emitting period of each pixel P. The gate driver 300 may be a shift register that sequentially outputs the scan signal.

The gate driver 300 generates a gate-on voltage level of sensing signal at every initialization period and sensing voltage charging period of each pixel P. The gate driver 300 sequentially supplies the sensing signal to the plurality of sensing signal lines SL.

The gate driver 300 may be configured in an integrated circuit (IC) type, or may be directly provided in a substrate of the display panel 100 in a process of forming the TFTs of the respective pixels P.

The gate driver 300 is connected to the plurality of driving power lines PL1 to PLm, and supplies a driving voltage VDD, supplied from an external power supply (not shown), to the plurality of driving power lines PL1 to PLm.

The data driver 200 is connected to the plurality of data lines D1 to Dn, and operates in the display mode and the sensing mode according to mode control by the timing controller 400.

The driving mode for displaying an image may be driven in the data charging period, for which each pixel is charged with a data voltage, and the light emitting period for which each organic light emitting diode OLED emits from light. The sensing mode may be driven in the initialization period for which each pixel is initialized, the sensing voltage charging period, and a sensing period.

The data driver 200 includes a data voltage generating unit 210, a sensing data generating unit 230, and a switching unit 240.

The data voltage generating unit 210 converts the input pixel data DATA into data voltages Vdata, and supplies the data voltages Vdata to the respective data lines DL. To this end, the data voltage generating unit 210 includes a shift register, a latch, a grayscale voltage generator, a digital-to-analog converter (DAC), and an output unit.

The shift register generates a plurality of sampling signals, and the latch latches the pixel data DATA according to the sampling signals. The grayscale voltage generator generates a plurality of grayscale voltages with a plurality of reference gamma voltages, and the DAC selects grayscale voltages corresponding to the latched pixel data DATA from among the plurality of grayscale voltages as data voltages Vdata to output the selected data voltages. The output unit outputs the data voltages Vdata.

The switching unit 240 includes a plurality of first switches 240*a* and a plurality of second switches 240*b*.

The plurality of first switches 240*a* switch the data voltages Vdata or a reference voltage Vpre_d to the respective data lines DL in the driving mode.

The plurality of second switches 240*b* switch the display reference voltage Vpre_r or the sensing precharging voltage Vpre_s so as to be supplied to the reference power lines RL in the sensing mode. Subsequently, the plurality of second switches 240*b* float the reference power lines RL. Then, each of the plurality of second switches 240*b* connects a corresponding reference power line RL to the sensing data generating unit 230, thereby allowing a corresponding pixel to be sensed.

The sensing data generating unit 230 is connected to the reference power lines RL by the switching unit 240, and senses a voltage charged into each of the reference power lines RL. Subsequently, the sensing data generating unit 230 generates digital sensing data corresponding to the sensed analog voltage, and supplies the digital sensing data to the timing controller 400.

The sensing data generating unit 230 supplies the sensing precharging voltage Vpre_s to the reference power lines RL of all the pixels at the power-on time and the power-off time. For example, the sensing precharging voltage Vpre_s may be supplied at 1 V.

The second switches 240*b* float the respective reference power lines RL. Subsequently, each of the second switches 240*b* connects a corresponding reference power line RL to the sensing data generating unit 230, thereby allowing a corresponding pixel to be sensed.

The sensing data generating unit 230 senses a voltage charged into the corresponding reference power line RL. Subsequently, the sensing data generating unit 230 generates digital sensing data corresponding to the sensed analog voltage, and supplies the digital sensing data to the timing controller 400.

In this case, the voltage sensed from the reference power line RL may be decided at a ratio of a current (flowing in a corresponding driving TFT DT) and a capacitance of the reference power line RL with time. Here, the sensing data is data corresponding to a threshold voltage/mobility of the driving TFT DT of each pixel P.

As another example, in the real-time sensing mode, the plurality of switches 240*b* are switched during the blank interval between the nth frame and the n+1 st frame, and the sensing data generating unit 230 supplies the sensing pre-charging voltage Vpre_s to one reference power line RL or the plurality of reference power lines RL. For example, the sensing precharging voltage Vpre_s may be supplied at 1 V.

Subsequently, the reference power line RL receiving the sensing precharging voltage Vpre_s is floated through the second switch 240*b*. Then, the reference power line RL is connected to the sensing data generating unit 230, thereby allowing a corresponding pixel to be sensed.

Figure 6:
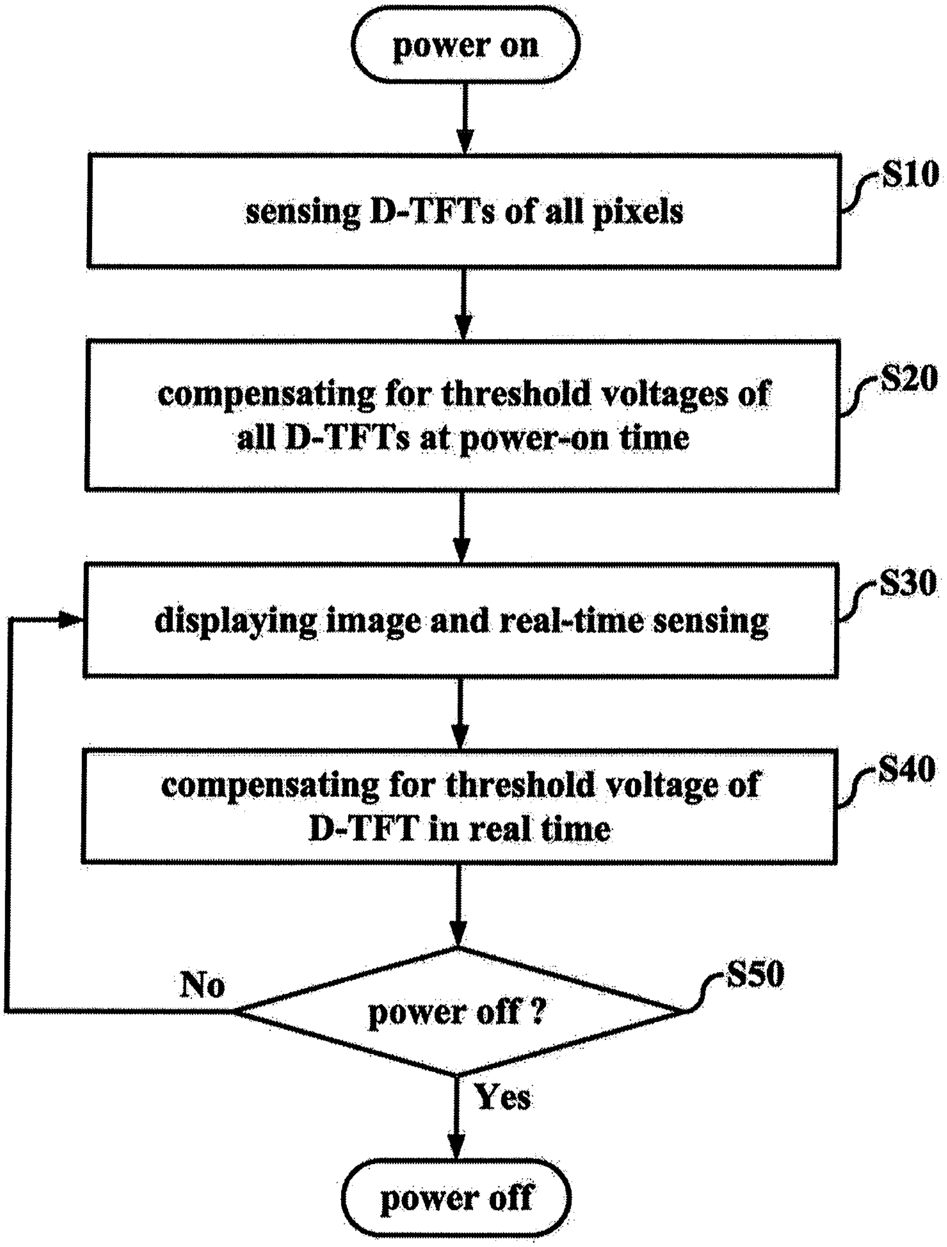
FIG. 6 is a diagram illustrating a method of compensating for a threshold voltage of a driving TFT according to a first embodiment of the present invention.

FIG. 6 is a diagram illustrating a method of compensating for a threshold voltage of a driving TFT according to a first embodiment of the present invention. The method of compensating for a threshold voltage of a driving TFT according to the first embodiment of the present invention will be described with reference to FIGS. 3 to 6. In FIG. 6, it is assumed that, after the display panel is manufactured, sensing and initial compensation of all the pixels are performed.

When the organic light emitting display device is powered on, the data driver 200 operates in a power-on sensing mode according to sensing-mode control by the timing controller 400, and characteristics (threshold voltage/mobility) of the driving TFTs of all the pixels of the display panel 100 are sensed, in operation S10.

Sensing data corresponding to the characteristics of the driving TFTs of all the pixels are generated by the sensing operation at the power-on time. At this time, the display device quickly senses the characteristics of the driving TFTs of all the pixels for about 2 sec to generate the sensing data at the power-on time.

Subsequently, the display device compensates for the characteristics of the driving TFTs of all the pixels by using sensing data at the power-on time. That is, the display device performs power-on compensation for the sensing data at the power-on time, in operation S20.

Here, the display device may reflect the sensing data, generated by the sensing operation at the power-on time, in the initial compensation data stored in the memory 500 to update compensation data, and store the updated compensation data in the memory 500.

The display device compensates for the characteristics of the driving TFTs of all the pixels with the compensation data generated on the basis of the sensing data at the power-on time. Accordingly, the present invention can reduce an influence of the changes in characteristics of the driving TFTs of all the pixels due to previous driving.

Subsequently, the display device supplies data voltages, in which the compensation data is reflected, to the display panel in the driving mode to display an image. Simultaneously, the display device senses pixels of one horizontal line in real time during the blank interval between frames, in operation S30.

Subsequently, the display device compensates for corresponding pixels in real time by using the sensing data generated by real-time sensing, in operation S40.

Subsequently, whether the organic light emitting display device is powered off is checked, in operation S50. When the organic light emitting display device is not powered off as the checked result, the display device repeats operations S30 to S50 to compensate for the characteristics of the driving TFTs of all the pixels in real time. When the organic light emitting display device is powered off, the display device completes real-time sensing and real-time compensation, and completes display of an image.

Figure 7:
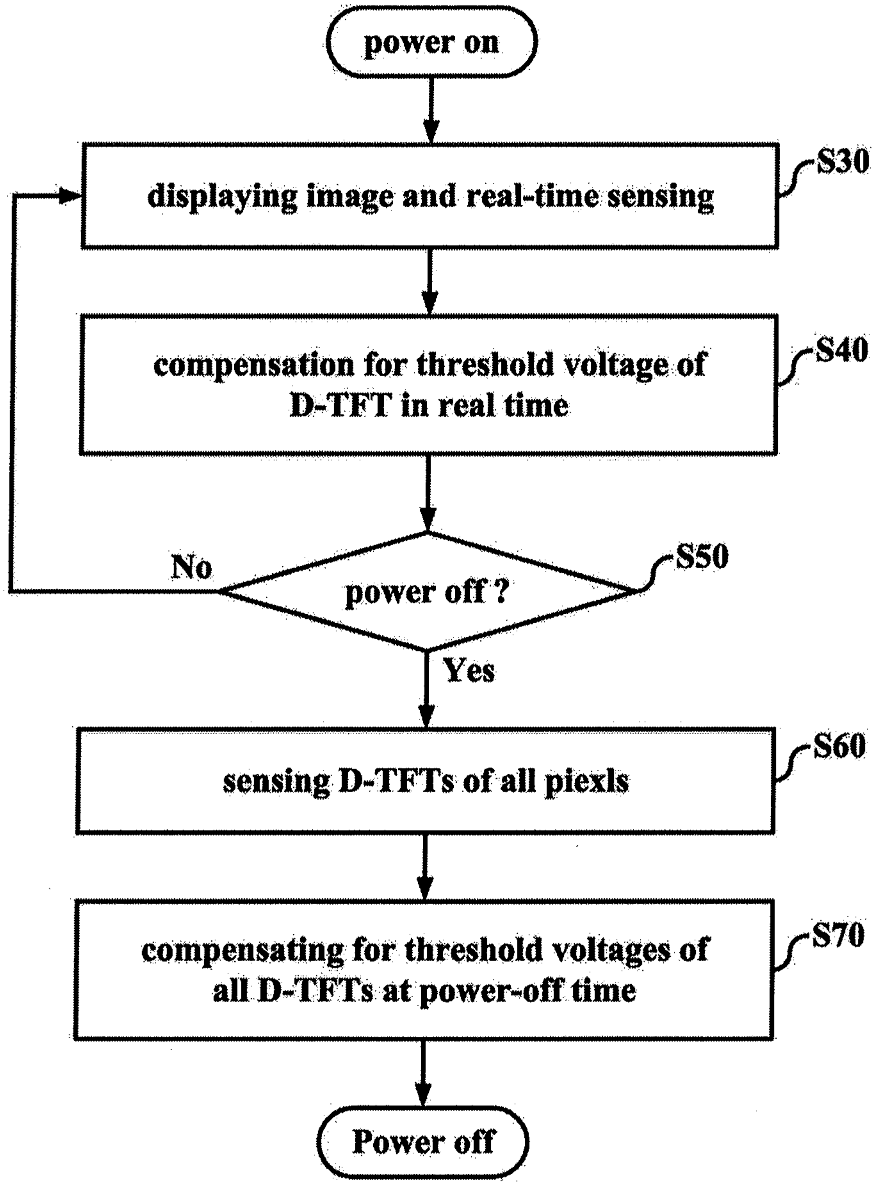
FIG. 7 is a diagram illustrating a method of compensating for a threshold voltage of a driving TFT according to a second embodiment of the present invention.

FIG. 7 is a diagram illustrating a method of compensating for a threshold voltage of a driving TFT according to a second embodiment of the present invention. The method of compensating for a threshold voltage of a driving TFT according to the second embodiment of the present invention will be described with reference to FIGS. 3 to 5 and 7. In FIG. 7, it is assumed that, after the display panel is manufactured, sensing and initial compensation of all the pixels are performed.

When the organic light emitting display device is powered on, the data driver 200 operates in the driving mode and real-time sensing mode according to sensing-mode control by the timing controller 400. The display device supplies data voltages, in which the compensation data is reflected, to the display panel in the driving mode to display an image, and senses pixels of one horizontal line in real time during the blank interval between frames, in operation S30.

Subsequently, the display device compensates for corresponding pixels in real time by using the sensing data generated by real-time sensing, in operation S40.

Subsequently, whether the organic light emitting display device is powered off is checked, in operation S50. When the organic light emitting display device is not powered off as the checked result, the display device repeats operations S30 to S50 to compensate for the characteristics of the driving TFTs of all the pixels in real time.

When the organic light emitting display device is powered off, the display device completes real-time sensing and real-time compensation, and completes display of an image.

Subsequently, the data driver 200 operates in a power-off sensing mode according to sensing-mode control by the timing controller 400, and senses the characteristics (threshold voltage/mobility) of the driving TFTs of all the pixels of the display panel 100, in operation S60. In this case, the display device accurately senses the characteristics of the driving TFTs of all the pixels for about 30 to 60 sec to generate sensing data at the power-off time. The display device generates sensing data corresponding to the characteristics of the driving TFTs of all the pixels through the sensing operation at the power-off time.

Subsequently, the display device compensates for the characteristics of the driving TFTs of all the pixels by using sensing data at the power-off time. That is, the display device performs power-on compensation for the sensing data at the power-off time, in operation S70.

Here, the display device may reflect the sensing data, generated by the power-off sensing operation, in the initial compensation data stored in the memory 500 to update compensation data, and store the updated compensation data in the memory 500.

The compensation data generated on the basis of the sensing data at the power-off time is applied at a next power-on time, thus reducing an influence of the changes in characteristics of the driving TFTs of all the pixels due to previous driving.

The compensation data generated on the basis of the sensing data at the power-off time may be stored in the memory 500 separately. Subsequently, the compensation data may be loaded at a next driving time or a predetermined time, and used in compensation of all the pixels.

Figure 8:
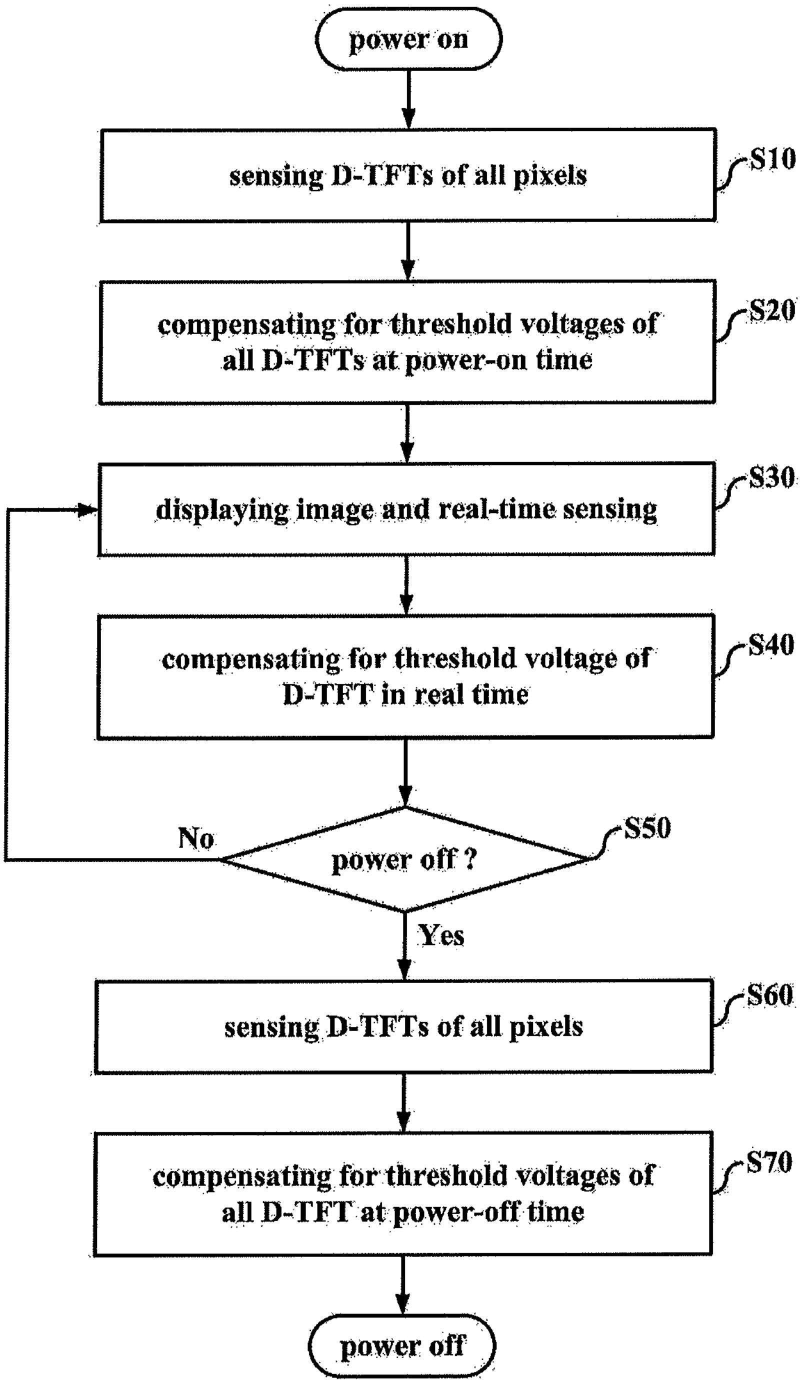
FIG. 8 is a diagram illustrating a method of compensating for a threshold voltage of a driving TFT according to a third embodiment of the present invention.

FIG. 8 is a diagram illustrating a method of compensating for a threshold voltage of a driving TFT according to a third embodiment of the present invention. The method of compensating for a threshold voltage of a driving TFT according to the third embodiment of the present invention will be described with reference to FIGS. 3 to 5 and 8. In FIG. 8, it is assumed that, after the display panel is manufactured, sensing and initial compensation of all the pixels are performed.

When the organic light emitting display device is powered on, the data driver 200 operates in a power-on sensing mode according to sensing-mode control by the timing controller 400, and characteristics (threshold voltage/mobility) of the driving TFTs of all the pixels of the display panel 100 are sensed, in operation S10.

Sensing data corresponding to the characteristics of the driving TFTs of all the pixels are generated by the sensing operation at the power-on time. At this time, the display device quickly senses the characteristics of the driving TFTs of all the pixels for about 2 sec to generate the sensing data at the power-on time.

Subsequently, the display device compensates for the characteristics of the driving TFTs of all the pixels by using sensing data at the power-on time. That is, the display device performs power-on compensation for the sensing data at the power-on time, in operation S20.

The display device compensates for the characteristics of the driving TFTs of all the pixels with the compensation data generated on the basis of the sensing data at the power-on time, thus reducing an influence of the changes in characteristics of the driving TFTs of all the pixels due to previous driving.

Subsequently, the data driver 200 operates in the driving mode and real-time sensing mode according to sensing-mode control by the timing controller 400. The display device supplies data voltages, in which the compensation data is reflected, to the display panel in the driving mode to display an image, and senses pixels of one horizontal line in real time during the blank interval between frames, in operation S30.

Subsequently, the display device compensates for corresponding pixels in real time by using the sensing data generated by real-time sensing, in operation S40.

Subsequently, whether the organic light emitting display device is powered off is checked, in operation S50. When the organic light emitting display device is not powered off as the checked result, the display device repeats operations S30 to S50 to compensate for the characteristics of the driving TFTs of all the pixels in real time.

When the organic light emitting display device is powered off, the display device completes real-time sensing and real-time compensation, and completes display of an image.

Subsequently, the data driver 200 operates in a power-off sensing mode according to sensing-mode control by the timing controller 400, and senses the characteristics (threshold voltage/mobility) of the driving TFTs of all the pixels of the display panel 100, in operation S60. In this case, the display device accurately senses the characteristics of the driving TFTs of all the pixels for about 30 to 60 sec to generate sensing data at the power-off time. The display device generates sensing data corresponding to the characteristics of the driving TFTs of all the pixels through the sensing operation at the power-off time.

Subsequently, the display device compensates for the characteristics of the driving TFTs of all the pixels by using sensing data at the power-off time. That is, the display device performs power-on compensation for the sensing data at the power-off time, in operation S70.

Here, the display device may reflect the sensing data, generated by the power-off sensing operation, in the initial compensation data stored in the memory 500 to update compensation data, and store the updated compensation data in the memory 500.

The compensation data generated on the basis of the sensing data at the power-off time is applied at a next power-on time, thus reducing an influence of the changes in characteristics of the driving TFTs of all the pixels due to previous driving.

The compensation data generated on the basis of the sensing data at the power-off time may be stored in the memory 500 separately. Subsequently, the compensation data may be loaded at a next driving time or a predetermined time, and used in compensation of all the pixels.

The above-described organic light emitting display device and driving method of the present invention enable a change in characteristic of a driving TFT, additionally compensated for by real-time sensing, to be within a measurable range through the power-on compensation and power-off compensation, thus increasing an accuracy and stability of real-time sensing and real-time compensation.

Even when a driving TFT is severely deteriorated by previous driving, the above-described organic light emitting display device and driving method of the present invention can compensate for a deterioration of the driving TFT to a level enabling real-time sensing and real-time compensation through the power-on compensation and power-off compensation.

The above-described organic light emitting display device and driving method of the present invention can compensate for a characteristic of a driving TFT to an initial state by real-time sensing driving of a few frames, thus shortening a time taken in compensation.

The above-described organic light emitting display device and driving method of the present invention simultaneously compensate for the driving TFTs of all the pixels through the power-on compensation and power-off compensation, and thus, when real-time sensing and real-time compensation are performed, can reduce an influence of data voltages which were supplied for displaying an image and decrease compensation errors caused by an ambient environment.

The above-described organic light emitting display device and driving method of the present invention can increase an accuracy of characteristic sensing of the driving TFTs, and thus increase an accuracy of compensation of a characteristic deviation of the driving TFTs. Accordingly, the present invention can increase a uniformity of all the pixels, and thus enhance an image quality and extend a service life of the organic light emitting display device.

The organic light emitting display device and the method of driving the same can increase an accuracy and stability of compensation of a threshold-voltage shift of a driving TFT.

The organic light emitting display device and the method of driving the same can shorten a real-time compensation time of a characteristic (threshold voltage/mobility) of a driving TFT.

The organic light emitting display device and the method of driving the same can reduce real-time compensation errors of a characteristic (threshold voltage/mobility) of a driving TFT.

The organic light emitting display device and the method of driving the same can compensate for a characteristic of a driving TFT to an initial state by real-time sensing driving of a few frames, thus shortening a time taken in compensation.

The organic light emitting display device and the method of driving the same can increase a uniformity of all the pixels, thus enhancing an image quality.

The organic light emitting display device and the method of driving the same can increase an accuracy of characteristic (threshold voltage/mobility) compensation of a driving TFT, thus extending a service life of the organic light emitting display device.

In addition to the aforesaid features and effects of the present invention, other features and effects of the present invention can be newly construed from the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An organic light emitting display device, which includes a display panel including a plurality of pixels each including a pixel circuit for emitting light from an organic light emitting diode, the organic light emitting display device comprising:

a driving circuit unit including a data driver and a gate driver;

a sensing unit configured to:

during a power-on period corresponding to when the display device is powered on following a release of the display device and before an image is displayed on the display panel for a power cycle, operate the data driver and the gate driver of the driving circuit unit in a sensing mode to sense characteristics of all the pixels of the display panel to generate sensing data based on the sensed characteristics; and during a driving mode following the power-on period and within the same power cycle, sequentially sensing characteristics of driving thin film transistors (TFTs) of the plurality of pixels in units of one horizontal line in real time during a blank interval between image frames being displayed to generate real-time sensing data;

a compensation data calculating unit in communication with the sensing unit and configured to:

load an initial compensation data generated based on an initial compensation performed before the display device is released;

merge the sensing data and the initial compensation data to generate updated compensation data; and generate real-time compensation data based on the real-time sensed data; and a panel driving unit configured to:

supply data voltages compensated according to the updated compensation data during the power-on period and according to the real-time compensation data during the driving mode.

2. The organic light emitting display device of claim 1, wherein the sensing unit senses the characteristics of the driving TFTs of the respective pixels at the power-on period when the OLED is powered on to generate a first sensing data, and wherein the sensing unit supplies the first sensing data to the compensation data calculating unit at the power-on period.

3. The organic light emitting display device of claim 2, wherein the compensation data calculating unit reflects the first sensing data in initial compensation data to update compensation data, and stores the updated compensation data in a memory, the initial compensation data being generated when initial compensation is performed before the display panel is released.

4. The organic light emitting display device of claim 1, wherein the panel driving unit supplies data voltages compensated by the compensation data to the respective pixels to enable an image to be displayed in the driving mode, and compensates for the characteristics of the driving TFTs of the respective pixels.

5. The organic light emitting display device of claim 1, wherein in the driving mode, characteristics of driving TFTs of a plurality of pixels are sequentially sensed in real time in units of one horizontal line during a blank interval between frames, and are sequentially compensated for in real time in units of one horizontal line by using a real-time sensing data generated by real-time sensing.

6. A method of driving an organic light emitting display device which includes a display panel including a plurality of pixels including a pixel circuit for emitting light from an organic light emitting diode (OLED) and a driving circuit unit driving the display panel, the method comprising:

generating initial compensation data based on an initial compensation performed before the display device is released;

during a power-on period corresponding to when the display device is powered on following the release of the display device and before an image is displayed on the display panel for a power cycle, sensing characteristics of driving thin film transistors (TFTs) of the plurality of pixels to generate sensing data;

merging the initial compensation data and the sensing data during the power-on period to compensate for the characteristics of the driving TFTs of the plurality of pixels after the display device is released;

displaying a plurality of image frames in a driving mode following the power-on period and within the same power cycle, and sequentially sensing characteristics of driving TFTs of the plurality of pixels in units of one horizontal line in real time during a blank interval between image frames being displayed to generate real-time sensing data; and sequentially compensating for the characteristics of the driving TFTs of the pixels in units of one horizontal line in real time based on the real-time sensing data generated by real-time sensing during the driving mode.

7. The method of claim 6, wherein the sensing at the power-on period senses changes in characteristics of the driving TFTs of the plurality of pixels to compensate for the characteristics of the driving TFTs of the plurality of pixels, before display of an image is started by supply of power to the display device.

8. The method of claim 6, further comprising updating the initial compensation data using the sensing data by sensing at the power-on period.

9. A method of driving an organic light emitting display device which includes a display panel including a plurality of pixels each including a pixel circuit for emitting light from an organic light emitting diode (OLED) and a driving thin film transistor (TFT), the method comprising:

generating initial compensation data based on an initial compensation performed before the display device is released;

performing a sensing operation to generate sensing data at at least one of a power-on period when the OLED is powered on following the release of the display device and before an image is displayed on the display panel for a power cycle, a driving mode following the power-on period and within the same power cycle when a plurality of image frames are displayed on the display panel, and a power-off period when the OLED is powered off indicating an end to the same power cycle, wherein the sensing data corresponds to a threshold voltage of the driving TFT;

updating initial compensation data by merging the initial compensation data with the sensing data to generate an updated compensation data; and driving the driving TFT based on the updated compensation data.

10. The method of claim 9, wherein the sensing operation includes a first sensing operation performed at the power-on period before the driving mode is started.

11. The method of claim 10, wherein the first sensing operation is performed for about 2 seconds.

12. The method of claim 10, wherein the sensing operation includes a second sensing operation performed during the driving mode when an image is displayed and during a blank interval between image frames.

13. The method of claim 12, wherein the second sensing operation is performed when a data voltage compensated by the sensing data generated at the first sensing operation is supplied to a display panel to display an image.

14. The method of claim 10, wherein the sensing operation includes a third sensing operation performed at the power-off time when the OLED is powered off.

15. The method of claim 14, further comprising applying the sensing data generated at the third sensing operation at a next power-on time.

16. The method of claim 14, wherein the third sensing operation is performed for 30-60 seconds.

17. The method of claim 9, wherein the sensing operation is performed at a power-on time for a period of time shorter than the time when the sensing operation is performed at a power-off time.

18. The method of claim 9, further comprising calculating a compensation data based on the sensing data.

19. The method of claim 18, further comprising correcting an external input data to a data driver based on the compensation data.

* * * * *